UNITED STATES PATENT OFFICE.

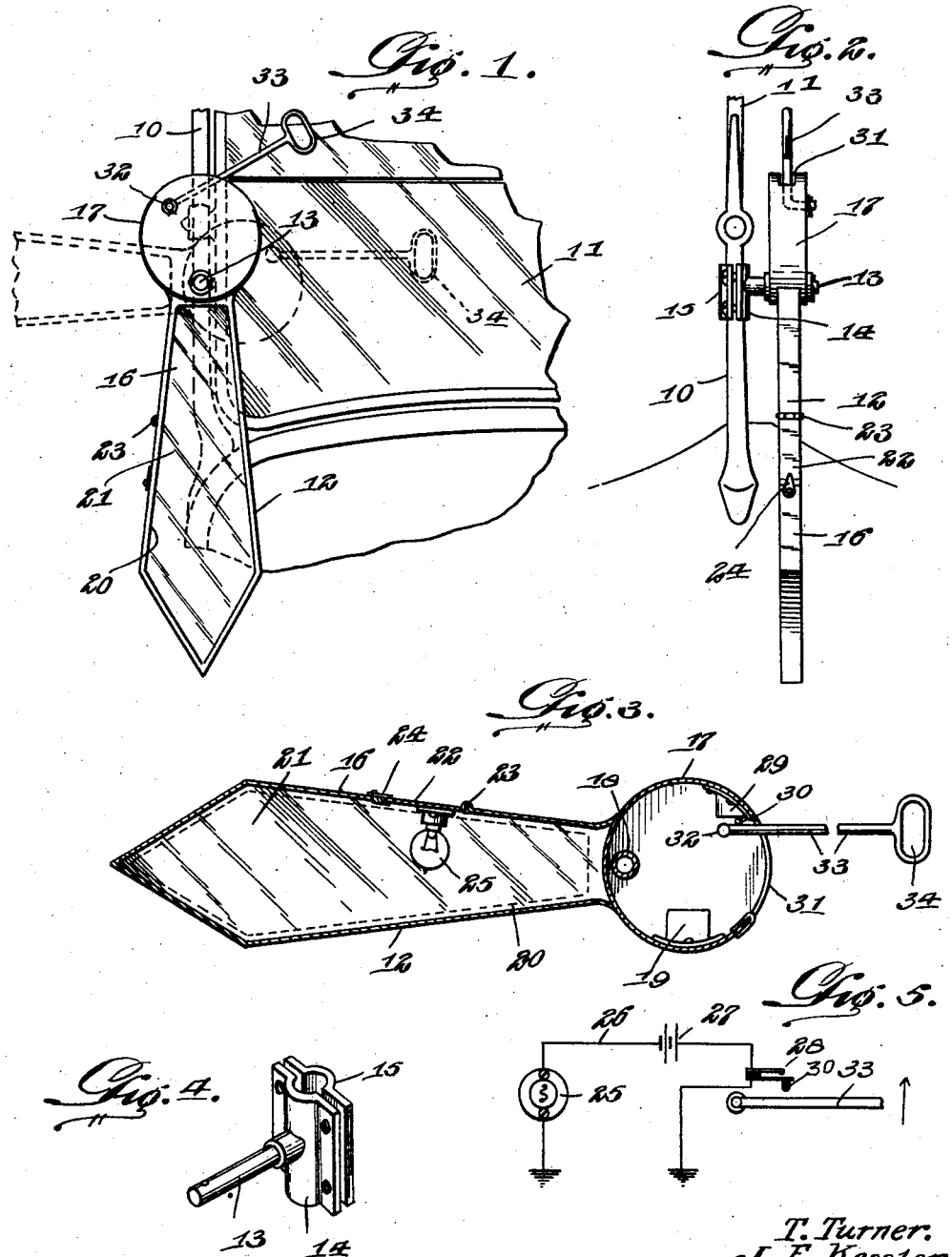

THOMAS TURNER, JOHN E. KESSLER, AND WILLIAM L. HIGGINS, OF HUNTINGTON, WEST VIRGINIA.

VEHICLE-SIGNAL.

1,388,675.  Specification of Letters Patent.  Patented Aug. 23, 1921.

Application filed February 9, 1920. Serial No. 357,393.

*To all whom it may concern:*

Be it known that we, THOMAS TURNER, JOHN E. KESSLER, and WILLIAM L. HIGGINS, citizens of the United States, residing at Huntington, in the county of Cabell and State of West Virginia, have invented new and useful Improvements in Vehicle-Signals, of which the following is a specification.

This invention relates to improvements in vehicle signals and aims to provide a signal especially designed for use upon motor vehicles to indicate a proposed change in the direction of travel.

An object of the present invention is to provide a signal, which may be moved by the driver of the vehicle to extend beyond the sides thereof for the purpose of attracting attention, to indicate a proposed change in the direction of travel, or of the slowing up or stopping of the vehicle and thereby relieve the driver of the necessity of extending his hand for this purpose.

Another object of the invention is the provision of means for automatically illuminating the signal when the latter reaches a signaling position, novel means being provided for accomplishing this result, so that the signal will more readily attract attention.

With the above and other objects in view, the invention further includes the following novel features and details of construction, to be hereinafter more fully described, illustrated in the accompanying drawings and pointed out in the claims hereunto appended.

In the drawings:—

Figure 1 is a fragmentary elevation of a portion of a vehicle wind shield showing the signal attached thereto, the full lines indicating the normal or inactive position of the signal, while the dotted lines indicate its active or signaling position.

Fig. 2 is an edge view of the same.

Fig. 3 is a longitudinal section of the signal arm.

Fig. 4 is a detail perspective view of the clamp by means of which the signal is secured in position.

Fig. 5 is a diagram of the wiring.

Referring to the drawings wherein like characters of reference denote corresponding parts, the signal is shown as secured to one of the side standards 10 of an automobile wind shield 11. It includes a signal arm or casing, designated by the reference character 12, the latter being pivotally mounted upon a stud 13, which is carried by one member 14 of a clamp. The other member of this clamp which is indicated at 15, is adapted to be secured to the member 14 in a manner to hold the signal in position upon the wind shield standard 10, so that the stud 13 will provide a pivotal mounting for the signal.

The arm or signal 12 comprises a casing which is formed into a lamp compartment 16 and a switch compartment 17, a sleeve 18 extending transversely through the latter compartment to receive the stud 13. Also located within the compartment 17 is a counter-balance weight 19.

The lamp compartment 16 is provided with openings 20 in its front and rear walls and these openings are adapted to be closed by a suitable transparent closure 21 such as celluloid or glass. The compartment 16 is further provided along one of its edges with a door 22, which is hinged as shown at 23 and is provided with a latch or button 24. Carried by the door 22 within the compartment 16 is an electric lamp 25, the latter being included in a circuit 26, to which current is supplied from any suitable source, such as a battery 27. Also included in the circuit 26 is a normally opened switch 28, the latter being shown in Fig. 3 as inclosed within a casing 29 located within the compartment 17, one member of the switch projecting from this compartment as shown at 30.

One wall of the compartment 17 is provided with an opening 31 and projecting through this opening and pivotally connected to the casing as shown at 32, is one end of an operating lever 33, the opposite end being provided with a handle 34 which is within convenient reach of the driver of the vehicle.

As the pivotal connection 32 of the operating arm 33 is eccentrically located with respect to the pivotal mounting of the signal arm, when the operating arm 33 is pulled to move the signal to the position shown by the dotted lines in Fig. 1, the projection 30 of the switch 28 will come in contact with the lever 33, closing the switch and completing the circuit 26 so as to light the lamp 25. As soon as the signal is permitted to lower, pressure will be released from the projection 30 and the switch 28 which is of the spring type will be automatically opened and the circuit broken.

The invention is susceptible of various changes in its form, proportions and minor details of construction, and the right is herein reserved to make such changes as properly fall within the scope of the appended claim.

Having described the invention what we claim is:—

A vehicle signaling device comprising a pivotally mounted hollow casing having a substantially circular base and a pointed arm extending therefrom, said casing being divided into a switch compartment and a signal compartment, the latter including the arm and having opposite transparent walls, an electric lamp located within the signal compartment and included in an electric circuit, an operating lever having one end pivotally secured within the switch compartment and its opposite end extending through a slot in the casing, a normally open switch located in the switch compartment in the path of the operating lever and connected in the lamp circuit, whereby when the signal is moved to an active position, the lever will engage and close the switch.

In testimony whereof we affix our signatures.

THOMAS TURNER.
JOHN E. KESSLER.
WILLIAM L. HIGGINS.